Patented Oct. 24, 1944

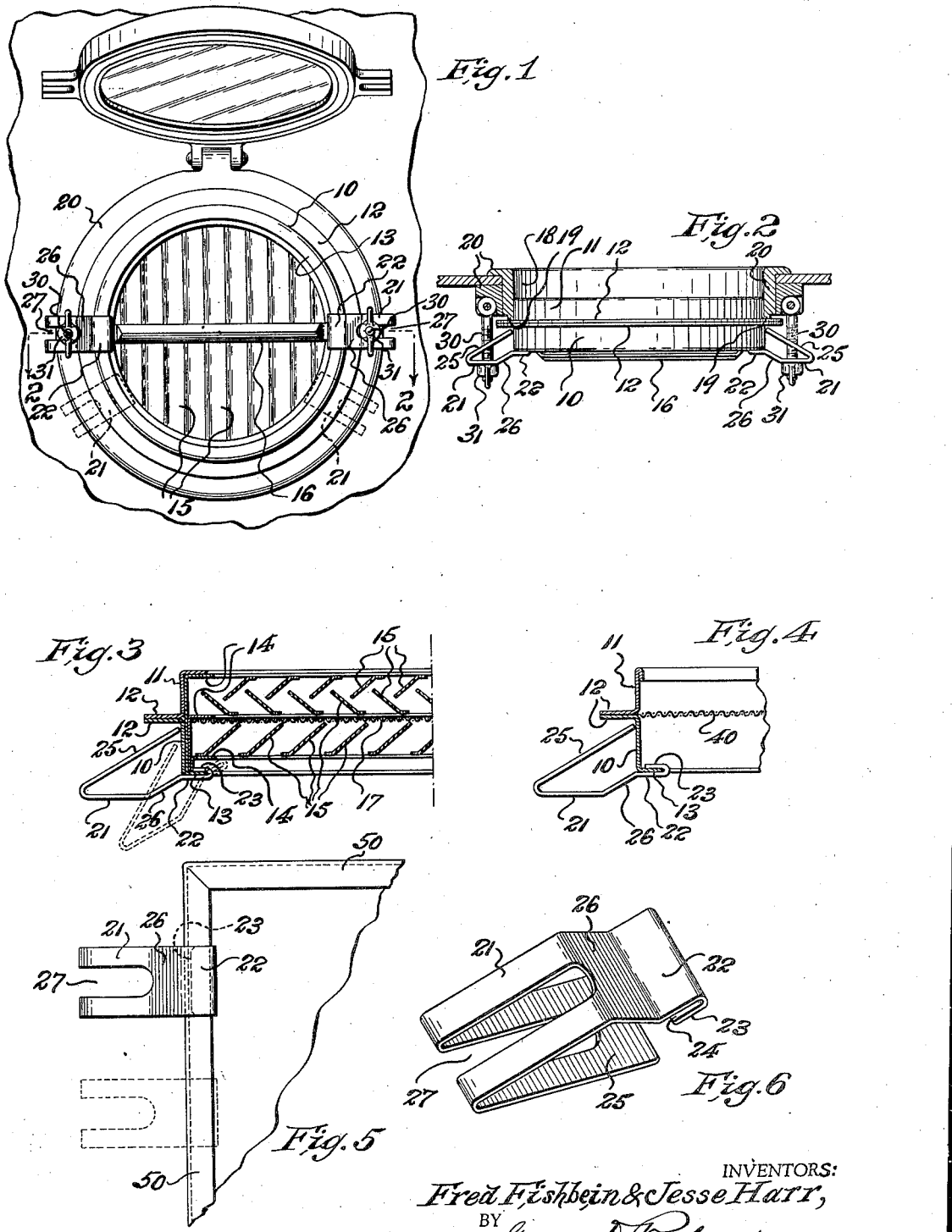

2,361,186

UNITED STATES PATENT OFFICE 2,361,186

ADJUSTABLE ATTACHMENT LUG MEANS FOR FRAMES AND OTHER STRUCTURES

Fred Fishbein and Jesse Harr, Newark, N. J.

Application April 16, 1943, Serial No. 483,278

5 Claims. (Cl. 98—121)

This invention relates to adjustable attachment lug means for securing frames and other structures in a place of use; and the invention has reference, more particularly, to novel adjustable attachment lug means for projection from the frames of ventilating, blackout, insect and like screens for use in ship portholes, window openings, transoms, or other openings; said lug means being adapted to cooperate with manipulatable or releasable fastening means operative to hold the frame served thereby in place.

This invention has for an object to provide attachment lug means for application to a desired structure in such manner that the lug means may be easily and quickly moved on and relative to the structure so as to adjustably position the same for accommodation to and cooperation with cooperative external fastening means or other external devices having a fixed location.

The invention has for another object to provide attachment lug means adapted to be quickly and easily assembled in operative relation to a frame, for projection therefrom, and yet free to be shifted along the frame periphery for adjustably positioning the same relative to cooperative external fastening means of fixed location.

The invention has for a further object to provide a novel construction of tumbling bolt or other fastener engageable lug means for attachment to and projection from the frame of a screen insertable in a ship porthole or other opening, said lug means being so constructed as to be capable of easy and quick shifting adjustment relative to and along the frame periphery, without disturbance of its operative attached relation to the latter, whereby the same may be quickly and easily brought into alignment with a tumbling bolt or other external fastener required to be engaged therewith.

The invention has for a still further object to provide an attachment lug means of the kind and for the purposes above mentioned, which is so made and formed from sheet metal, and so related to the frame to which it is connected, as to provide for a resilient or springy reaction to a tumbling bolt or other fastener by which it is engaged, and thus being adapted to cushion the frame served and secured thereby against vibration, rattling or like effects.

Other objects of this invention, not at this time more particularly enumerated, will be understood from the following detailed description of the same.

Illustrative embodiments of the present invention are shown in the accompanying drawing, in which:

Fig. 1 is an interior elevational view of an open ship's porthole, the aperture of which is closed by a ventilating blackout screen, the frame of the latter being provided with the novel attachment lug means of this invention, shown as operatively engaged by tumbling bolts for securing the screen in the porthole aperture; and Fig. 2 is a horizontal sectional view, taken on line 2—2 in Fig. 1, but showing the inserted screen in elevation.

Fig. 3 is a fragmentary cross sectional view of a ventilating blackout screen, the frame of which is provided with the novel adjustable attachment lug means of this invention.

Fig. 4 is a fragmentary cross sectional view of an insect screen, the frame of which is provided with the novel adjustable attachment lug means of this invention.

Fig. 5 is a fragmentary face view of a rectangular frame having the novel adjustable attachment lug means applied thereto.

Fig. 6 is a perspective view of the novel attachment lug means per se.

Similar characters of reference are employed in the above described views, to indicate corresponding parts.

In Figs. 1 to 3 inclusive is shown a ventilating blackout screen for insertion in an open ship porthole, the frame of said screen being equipped with the novel attachment lug means according to this invention. Illustratively, as shown, the blackout screen comprises a circular frame preferably composed of two circular frame sections 10 and 11, each having outwardly projecting peripheral flanges 12 in the plane of their inner faces. The frame sections 10 and 11 are registered together with their said flanges 12 meeting in face to face abutment, the latter being thereupon suitably secured together, as e. g. by welding. At least the inner frame section 10 is provided with an inwardly projecting peripheral flange 13 in the plane of its outer face. Mounted within the frame thus provided are a plurality of spaced apart louver carrying plates 14 which extend across the frame interior so as to fill the opening thereof. Each said plate 14 is provided with a series of louver elements 15 obliquely projecting therefrom. The disposition of the louver elements 15 of the several carrying plates 14 is such, that the louvers of adjacent plates are in staggered relation, whereby openings between louvers of one plate are lapped by louvers of an adjacent plate. By this arrangement passage of both obliquely and axially directed light rays seeking to penetrate the screen are cut off, while nevertheless tortuous paths of air movement through the screen for ventilating effect are provided. The louver carrying plates 14 are suitably secured together, so that the assembly thereof constitutes a unitary screen body, which, if desired, may be mounted in the frame 10—11 so as to be free to rotate therein; the unitary screen body thus provided being furnished on its inner face with a handle means 16 suitably affixed thereto, and whereby said screen unit may be rotatively adjusted within the frame 10—11. If desired, a layer of wire mesh 17 may be disposed and secured to a selected louver carrying plate, whereby to obstruct the passage of insects through the screen unit. A porthole ventilating blackout screen of the type of construction as thus above generally described is disclosed in our copending application for United States Letters Patent Ser. No. 459,231, filed September 22, 1942.

The circular body of the frame of the porthole ventilating blackout screen is sized to correspond in diameter to the internal diameter of a porthole 18 in which it is to be inserted for ventilating blackout protection thereof; the inserted frame body being stopped against outward displacement through the porthole 18 by abutment of its outer peripheral flange structure 12 against the inner margins 19 of the porthole frame 20 (see Fig. 2).

The screen body 10—11 is provided with the novel adjustable attachment lug means according to this invention. Each such lug means is formed from sheet metal of reasonably heavy gauge, and comprises, in one illustrative form thereof as shown, a main body 21 terminating at its rear end in a transverse gripper clip portion 22 having a gripper tongue 23 doubled back and beneath the same, and spaced therefrom, to provide an intermediate forwardly open bight 24. The forward end portion of the main body 21 is downwardly and rearwardly doubled back upon itself to provide an oblique or acutely angular strut and keeper section 25 of suitable length. Preferably the main body 21 is formed intermediate its gripper clip portion 22 and its forward end portion with an inclined offsetting connection 26, whereby the plane of the forward end portion of said main body 21 may be outwardly offset a suitable distance from the gripper clip portion and thus from the frame itself, in cases where such disposition would be of advantage or desirable. The main body 21, and the strut or keeper section 25 which springs from the free or outer end thereof are continuously slotted longitudinally to provide an outwardly open way or notch 27 for the reception of cooperative external fastening means by which the lug is to be engaged in use.

To assemble and mount the attachment lug in operative relation to the ventilating blackout screen frame, the open inner end of the bight 24 of the lug gripper clip portion 22 is opposed to the edge of the inwardly projecting peripheral flange 13 of the inner frame section 10, the lug being outwardly inclined (as shown in dotted outline in Fig. 3) so as to allow the free end of the strut or keeper section 25 to clear the external surface of said inner frame section 10. When so disposed, the lug is then swung down into position so that the bight 24 of the gripper clip portion 22 receives the frame section flange 13, with the gripper clip portion 22 bearing flat against the outer face of said flange 13, while the gripper tongue 23 bears flat against the inner face of said flange 13, and so that the free end of the strut or keeper section 25 abuts the outer surface of the frame section 10 adjacent to the junction thereof with the outwardly projecting peripheral flange 12 of said frame section. The width of the bight 24 is somewhat less than the thickness of the frame section flange 13 so that the gripper clip portion 22 and its gripper tongue 23 bind frictionally against the said flange 13. Accidental displacement of the lug from the screen frame is further guarded against by reason of the opposition of the free end of the strut or keeper section 25 to the external surface of the frame section 10, whereby any tendency of the gripper clip portion 22 and its gripper tongue 23 to back away and off the flange 13 is obstructed and prevented. By reason of such frictionally gripped relation of the lug to the frame section flange 13, the lug retains itself in any given attached position in which it may be disposed thereon, and yet, since it is not positively affixed thereto, the lug may be slid back and forth along the flange 13, by mild tapping thereof, whereby to adjust the projected position of the lug to properly correspond with the location of an external cooperating fastening means by which the lug is to be engaged. For example, as shown in Figs. 1 and 2, wherein the attachment lugs are applied to the screen frame for cooperation with horizontally aligned tumbling bolts 30 disposed at opposite sides of the porthole frame 20; if the said tumbling bolts are not in perfect alignment, one or both lugs may be shifted around the frame in such direction, as may be necessary, so as to bring them respectively in properly aligned and fitting relation to the tumbling bolts, whereupon the latter may swing into the notches of the lugs, and thereupon the retaining nuts 31 of said bolts may be screwed home against the lugs, so as to secure the screen against displacement from the porthole opening 18 in which it is inserted. When a nut 31 is screwed home against an attachment lug, undue yielding or deformation of the lug structure under the pressure of the nut will be prevented by the abutment of the end of the strut or keeper section 25 in and against the juncture of the frame side and its outer flange 12, whereby the strut or keeper section 25 braces and limits undue yielding movement of the lug body, notwithstanding this, however, owing to the sheet metal construction of the lug, the same will possess a degree of resiliency or spring character which is sufficient, when the nut 31 thrustingly bears upon the same, to effect some resilient tensional thrust upon the screen frame which is sufficient to maintain the latter pressed home into the porthole frame in such manner as to cushion the same against vibration or rattling.

Another advantage of the adjustable lug arrangement is that the same may be shifted to correspond to various positions of tumbling bolt or like fastening means which may be located in other than horizontal alignment. For example, in some ship porthole structures, the tumbling bolts may be spaced e. g. one hundred and twenty degrees apart, in which case the attachment lugs are shifted along the screen frame to correspondingly spaced relation, as indicated in dotted outline in Fig. 1. From this it will be obvious that a standardized screen frame attachment means is provided, which can readily be adjusted, on the job and without special tool equipment, to accommodate and cooperate with variously arranged and located cooperative fastening means, and without necessity for constructive alteration during initial production, or for change or removal and replacement of parts.

In Fig. 4, the attachment lug is shown applied to the frame of a simple insect screen for ship porthole or other aperture closure. Illustratively the frame comprises the sections 10 and 11 joined by their outer peripheral flange 12, between which the margins of the screen mesh 40 may be bound, and the frame section 10 is provided with the inner peripheral flange 13 to which the gripper clip portion 22 of the attachment lug is engaged.

It will be understood that the novel attachment lug may be applied to frames of various shapes adapted to be fitted and secured within openings of corresponding shapes, such e. g. as rectangular frames 50 for use in windows, transoms and similar openings (see Fig. 5).

It will be further understood, that the specific detail construction of the attachment lug per se may be varied for cooperation with various kinds of external cooperative fastening devices other than tumbling bolts; and also the attachment lug may be varied for cooperation with or support of devices or parts otherwise desired to be associated with or operatively related to the structure upon which the lug is mounted and from which it projects.

Having now described our invention, we claim:

1. In combination with a screen or like frame for an opening, said frame comprising a peripheral wall and an angular flange projecting inwardly from a margin thereof, an adjustable attachment lug comprising a body having at its rear end a gripper clip portion, said clip portion being doubled back upon itself to provide a gripper tongue spaced therefrom to form a bight to receive said frame wall flange so as to frictionally grip said flange while nevertheless being free to be adjustably shifted therealong, said lug body being adapted, when so mounted, to project outwardly of the frame, said lug body terminating at its free end in a strut and keeper portion doubled back therefrom and disposed angularly thereto so as to oppose its free end portion for abutment upon said frame wall, and said lug and its strut and keeper portion having open portions to receive external cooperative fastening means engageable with said lug for securing the frame against displacement from the opening served thereby.

2. A ventilating, blackout, insect or like screen for ship portholes comprising a frame having a peripheral wall sized to fit into a porthole, an internal flange extending from the inner margin of said frame wall, and adjustable attachment lug means for said screen frame adapted to be engaged by tumbling bolts of the porthole structure whereby to hold the screen against displacement from the porthole, said lug means comprising a body having at its inner end a gripper clip portion, said clip portion being doubled back upon itself to provide a gripper tongue spaced therefrom to form a bight to receive said internal flange of the frame wall so as to frictionally grip the same while nevertheless being free to be adjustably shifted therealong for alignment with said tumbling bolts, said lug body being adapted to project outwardly beyond the frame wall, said lug body terminating at its outer free end in a strut and keeper member doubled back therefrom and disposed angularly thereto so as to oppose its free end portion for abutment upon said frame wall, and said lug body and strut and keeper member having open portions to receive said tumbling bolts.

3. A ventilating, blackout, insect or like screen for ship portholes comprising a frame having a peripheral wall sized to fit into a porthole, an internal flange extending from the inner margin of said frame wall, and adjustable attachment lug means for said screen frame adapted to be engaged by tumbling bolts of the porthole structure whereby to hold the screen against displacement from the porthole, said lug means comprising a body having at its inner end a gripper clip portion, said clip portion being doubled back upon itself to provide a gripper tongue and spaced therefrom to form a bight to receive said internal flange of the frame wall so as to frictionally grip the same while nevertheless being free to be adjustably shifted therealong for alignment with said tumbling bolts, said lug body being adapted to project outwardly beyond the frame wall, said lug body terminating at its outer free end in a strut and keeper member doubled back therefrom and disposed angularly thereto so as to oppose its free end portion for abutment upon said frame wall, said lug body and strut and keeper member having open portions to receive said tumbling bolts, and said attachment lug means being formed from sheet metal and possessed of a degree of resiliency adapted under pressure of the operative engagement of said tumbling bolts therewith to cushion the porthole engaging screen against vibration or rattling.

4. A ventilating, blackout, insect or like screen for ship portholes comprising a frame having a peripheral wall sized to fit into a porthole, said frame wall having an external flange to stop the same against the porthole structure, said frame wall having an internal flange extending from its inner margin, and adjustable attachment lug means for said screen frame adapted to be engaged by tumbling bolts of the porthole structure whereby to hold the screen against displacement from the porthole, said lug means comprising a body having at one end a gripper clip portion, said clip portion being doubled back upon itself to provide a gripper tongue spaced therefrom to form a bight to receive said internal flange of the frame wall so as to frictionally grip the same while nevertheless being free to be adjustably shifted therealong for alignment with said tumbling bolts, said lug body being adapted to project outwardly beyond the frame wall, said lug body terminating at its outer free end in a strut and keeper member doubled back therefrom and disposed angularly thereto to oppose the juncture of the frame wall and its external flange, and said lug body and strut and keeper member being indentingly slotted to receive said tumbling bolts.

5. A ventilating, blackout, insect or like screen for ship portholes comprising a frame having a peripheral wall sized to fit into a porthole, said frame wall having an external flange to stop the same against the porthole structure, said frame wall having an internal flange extending from its inner margin, and adjustable attachment lug means for said screen frame adapted to be engaged by tumbling bolts of the porthole structure whereby to hold the screen against displacement from the porthole, said lug means comprising a body having at one end a gripper clip portion, said clip portion being doubled back upon itself to provide a gripper tongue and spaced therefrom to form a bight to receive said internal flange of the frame wall so as to frictionally grip the same while nevertheless being free to be adjustably shifted therealong for alignment with said tumbling bolts, said lug body being adapted to project outwardly beyond the frame wall, said lug body terminating at its outer free end in a strut and keeper member doubled back therefrom and disposed angularly thereto to oppose the juncture of the frame wall and its external flange, said lug body and strut and keeper member being indentingly slotted to receive said tumbling bolts, and said attachment lug means being formed from sheet metal and possessed of a degree of resiliency adapted under pressure of the operative engagement of said tumbling bolts therewith to cushion the porthole engaging screen against vibration or rattling.

FRED FISHBEIN.
JESSE HARR.